C. R. STURDEVANT.
PROCESS OF ELECTRICALLY WELDING METALS.
APPLICATION FILED APR. 1, 1909.
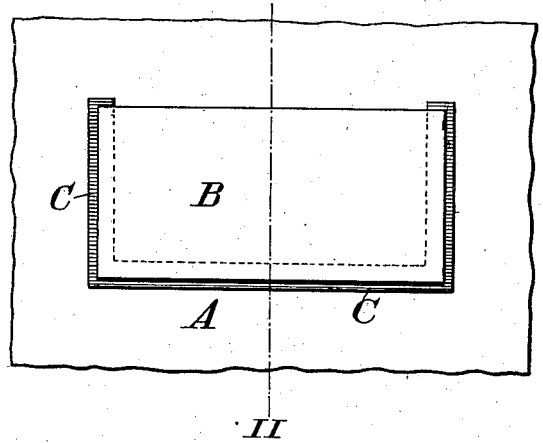
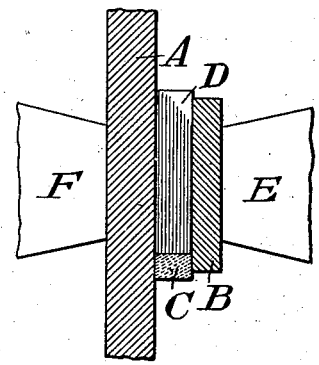
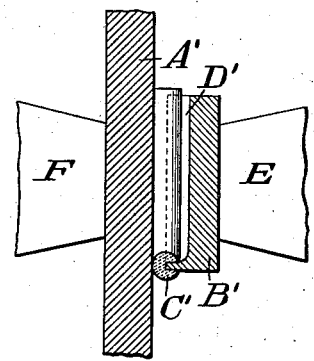

UNITED STATES PATENT OFFICE.

CHARLES R. STURDEVANT, OF WORCESTER, MASSACHUSETTS, ASSIGNOR TO AMERICAN STEEL & WIRE COMPANY, OF WORCESTER, MASSACHUSETTS, A CORPORATION OF NEW JERSEY.

PROCESS OF ELECTRICALLY WELDING METALS.

934,854. Specification of Letters Patent. Patented Sept. 21, 1909.

Application filed April 1, 1909. Serial No. 487,234.

*To all whom it may concern:*

Be it known that I, CHARLES R. STURDEVANT, of Worcester, in the county of Worcester and State of Massachusetts, have invented a new and useful Process of Electrically Welding Metals, of which the following is a full, clear, and exact description, reference being had to the accompanying drawings, forming part of this specification, in which—

Figure 1 shows in plan view two pieces of metal A and B which are placed in position preparatory to welding them; Fig. 2 is a vertical section on the line II—II of Fig. 1, illustrating also in diagram the electrodes by which the electric current is supplied for heating the parts to be welded; and Fig. 3 is a sectional view similar to Fig. 2, but showing a modified arrangement.

My invention provides simple and convenient means for electrically welding two pieces of metal. It has been designed by me particularly with reference to its use in welding of rail bonds to rails, which present peculiar difficulties; but the invention has more general application and may be used for welding parts of metal together for other purposes.

The figures of the drawing illustrate an application of my invention for the welding together of two pieces of metal, A and B. The part A may be the web of a steel rail, and the part B the copper terminal of a rail bond which is to be affixed to the rail. For the purpose of welding these parts I apply the part B in proximity to the part A with an interposed insulating separator C, which is composed of a fusible fluxing material or salt, which holds the parts A and B apart, presenting an intermediate space or pocket D open at the top. As shown in Fig. 2 the insulating separator C is made of a separate piece and forms an open frame, which is set between the parts A and B; and when these parts have been so arranged the intervening space D is filled with a fused flux of a less melting point than the insulating material C. This fused flux may be of the composition such as has been used heretofore for the purpose of furnishing an electrolytic conductor for heating metals to be joined together, by passing a current through a body of such flux and then displacing it with molten metal. Such flux commonly consists of a mixture of borax, chlorates and carbonates which have the property of melting readily and of affording a convenient electrolytic conductor. The composition and the proportions of the ingredients will be modified by those skilled in the art in conformity to the welding temperature which is to be attained. The body of insulating material C is also a fusible salt, but is chosen so as to be of a higher melting point than the molten material which is introduced into the space D. A suitable composition for this body of insulating material may be composed of substantially equal parts of borax and silica, but other suitable materials may be used.

The space or pocket D having been charged with the molten salt, an electric current of large volume is supplied through the electrodes E and F of an electric welding machine. It flows through the metal pieces A and B and through the intermediate body of fused electrolyte, which opposes considerable resistance and generates locally a high heat. It also has the function of cleansing the opposite surfaces of the metal parts.

When the metal parts A and B have been heated by the passage of the electric current in this manner to the desired temperature to effect their welding, the heat thus generated melts the body of insulating material C (the fusing temperature of which is substantially the same as the welding temperatures of the metals), and this body thereupon drops away, causing the molten charge of flux to be discharged from the pocket D and immediately the metal pieces A and B are brought into contact, pressure is applied to them through the electrodes E and F by means of screws or levers usual in electric welding apparatus, and they are pressed together into intimate welding contact.

The advantages of this invention will be appreciated by those skilled in the art. Only those portions of the metal pieces A and B are heated which are desired to be welded, and the insulating material melts and discharges at the critical period and serves as a reliable index of the moment when the surfaces have been sufficiently heated and the welding pressure should be applied.

In Fig. 3 I show a modified arrangement in which the body of insulating material C' is not molded separately, as in Fig. 2, but is applied as a glassy lining to the edge of the piece B, and for this purpose it may be applied by dipping the edge of said piece in the body of the molten material C' which will immediately chill and adhere. The sharp edge of the metal plate C' being of copper, will melt away during the welding of the metals.

My invention may be applied to use in many ways, since

What I claim is:

1. The method herein described of heating metal surfaces to be united, which consists in insulating the surfaces by fusible insulating material, placing an intermediate body of fusible material between the surfaces, and passing a current through the intermediate body until the insulating material has melted.

2. The method herein described of welding metal surfaces to be united, which consists in separating the surfaces by insulating material, placing a fusible flux between such surfaces having a lower melting point than the fusible insulating material, passing a current through the intermediate flux until the insulating material has melted, and then pressing the surfaces together and electrically welding them.

3. The herein described method of heating metal surfaces, which consists in insulating the surfaces from each other by a fusible insulating material, and placing a body of fusible fluxing salt, having a lower fusing point than the insulating material, between the surfaces, and passing a current through the body of fluxing salt until the insulating material has melted; substantially as described.

In testimony whereof, I have hereunto set my hand.

CHARLES R. STURDEVANT.

Witnesses:
THOMAS W. BAKEWELL,
EUGENE H. MURPHY.